United States Patent
Barner

(10) Patent No.: US 10,592,452 B1
(45) Date of Patent: Mar. 17, 2020

(54) LOW LATENCY INTERCONNECT PROTOCOL FOR COHERENT MULTI-CHIP COMMUNICATION

(71) Applicant: Cavium, LLC, Santa Clara, CA (US)

(72) Inventor: Steven C. Barner, Shrewsbury, MA (US)

(73) Assignee: CAVIUM, LLC, Santa Clara, CA (US)

( * ) Notice: Subject to any disclaimer, the term of this patent is extended or adjusted under 35 U.S.C. 154(b) by 0 days.

(21) Appl. No.: 16/129,107

(22) Filed: Sep. 12, 2018

(51) Int. Cl.
G06F 13/40 (2006.01)

(52) U.S. Cl.
CPC .................. *G06F 13/4009* (2013.01)

(58) Field of Classification Search
None
See application file for complete search history.

(56) References Cited

U.S. PATENT DOCUMENTS

| | | | |
|---|---|---|---|
| 8,560,757 B2 | 10/2013 | Pangborn et al. | |
| 8,855,248 B2 | 10/2014 | Barner | |
| 9,059,836 B2 | 6/2015 | Barner | |
| 9,372,800 B2 | 6/2016 | Akkawi et al. | |
| 9,432,288 B2 | 8/2016 | Barner et al. | |
| 9,471,416 B2 | 10/2016 | Barner | |
| 9,605,626 B2 | 3/2017 | Harris et al. | |
| 9,824,058 B2 | 11/2017 | Barner | |
| 9,933,809 B2 | 4/2018 | Barner | |
| 2009/0083263 A1 | 3/2009 | Felch et al. | |
| 2013/0103909 A1 | 4/2013 | Pangborn et al. | |
| 2013/0111141 A1 | 5/2013 | Kessler et al. | |
| 2014/0189094 A1 | 7/2014 | Ditya | |

OTHER PUBLICATIONS

Yoon, et al., "Virtual Channels vs. Multiple Physical Networks: A Comparative Analysis," DAC'10, Jun. 13-18, 2010, Anaheim, California, p. 162-165.

Notice of Allowance for U.S. Appl. No. 14/194,049, entitled, "System on Chip Link Layer Protocol," 13 pages, dated May 6, 2016.

*Primary Examiner* — Idriss N Alrobaye
*Assistant Examiner* — Dayton Lewis-Taylor
(74) *Attorney, Agent, or Firm* — Hamilton, Brook, Smith & Reynolds, P.C.

(57) ABSTRACT

In one embodiment, a data message is generated at a first system-on-chip (SOC) for transmission to a second SOC. A stream of data words is generated from the data message, the data words alternating between even and odd data words. Each data word in the stream of data words is divided into a first pattern of slices for even data words and a second pattern of slices for odd data words, with the slices distributed across plural output ports at the first SOC. At each output port, two slices from two successive cycles are grouped. The grouped slices are encoded using an encoding scheme to produce an N-bit symbol at M-bits per cycle, alternating between high and low parts of the encoding. Plural metaframes are generated from a stream of symbols and the metaframes for each of the output ports are transmitted to the second SOC.

25 Claims, 13 Drawing Sheets

| | |
|---|---|
| 8'h0 | DAT[151:144] - LINK-CONTROL WORD |
| CRC | DAT[143:120] - CRC24 |
| REQ | DAT[119:118] - HANDSHAKE REQUEST |
| ACK | DAT[117:116] - HANDSHAKE ACK |
| KEY | DAT[115:112] - TRUSTZONE KEY SELECT |
| RSV | DAT[111      ] - RESERVED |
| RSV | DAT[110: 96] - RESERVED |
| PAYLOAD | DAT[ 95:  0] - INIT/RETRY SPECIFIC |

FIG. 4

| | |
|---|---|
| 8'h0 | DAT[151:144] - LINK-CONTROL WORD |
| CRC | DAT[143:120] - CRC24 |
| REQ | DAT[119:118] - HANDSHAKE REQUEST |
| ACK | DAT[117:116] - HANDSHAKE ACK |
| KEY | DAT[115:112] - TRUSTZONE KEY SELECT |
| RSV | DAT[111     ] - RESERVED |
| RSV | DAT[110: 96] - RESERVED |
| VC15_CC | DAT[ 95: 90] - VC15 CREDIT COUNT |
| VC14_CC | DAT[ 89: 84] - VC14 CREDIT COUNT |
| VC13_CC | DAT[ 83: 78] - VC13 CREDIT COUNT |
| VC12_CC | DAT[ 77: 72] - VC12 CREDIT COUNT |
| VC11_CC | DAT[ 71: 66] - VC11 CREDIT COUNT |
| VC10_CC | DAT[ 65: 60] - VC10 CREDIT COUNT |
| VC09_CC | DAT[ 59: 54] - VC09 CREDIT COUNT |
| VC08_CC | DAT[ 53: 48] - VC08 CREDIT COUNT |
| VC07_CC | DAT[ 47: 42] - VC07 CREDIT COUNT |
| VC06_CC | DAT[ 41: 36] - VC06 CREDIT COUNT |
| VC05_CC | DAT[ 35: 30] - VC05 CREDIT COUNT |
| VC04_CC | DAT[ 29: 24] - VC04 CREDIT COUNT |
| VC03_CC | DAT[ 23: 18] - VC03 CREDIT COUNT |
| VC02_CC | DAT[ 17: 12] - VC02 CREDIT COUNT |
| VC01_CC | DAT[ 11:  6] - VC01 CREDIT COUNT |
| VC00_CC | DAT[  5:  0] - VC00 CREDIT COUNT |

FIG. 5

| | |
|---|---|
| 8'h0 | DAT[151:144] - LINK-CONTROL WORD |
| CRC | DAT[143:120] - CRC24 |
| REQ | DAT[119:118] - HANDSHAKE REQUEST |
| ACK | DAT[117:116] - HANDSHAKE ACK |
| KEY | DAT[115:112] - TRUSTZONE KEY SELECT |
| RSV | DAT[111     ] - RESERVED |
| RSV | DAT[110: 96] - RESERVED |
| SQN_ACK | DAT[ 95     ] - SEQUENCE NUMBER ACK |
| RSV | DAT[ 94: 32] - RESERVED |
| RSV | DAT[ 31: 24] - RSV FOR RX_SQN |
| RSV | DAT[ 23: 16] - NEXT RX SEQUENCE NUMBER |
| RSV | DAT[ 15:  8] - RSV FOR TX_SQN |
| TX_SQN | DAT[ 7:  0] - NEXT TX SEQUENCE NUMBER |

SYNCHRONIZATION: [39] b01 [37] b00 [35] DME LANE STATUS [19] h8F678 [0]

SCRAMBLER STATE: [39] b01 [37] b100111 [31] DC[5:3] [28] SCRAMBLER STATE[57:29] [0]

SCRAMBLER STATE: [39] b01 [37] b100110 [31] DC[2:0] [28] SCRAMBLER STATE[28:0] [0]

DIAGNOSTIC: [39] b01 [37] b11 [35] RSV [31] CRC32 [0]

| 39 | 37 | 35 | 31 | 19 | 0 |
|---|---|---|---|---|---|
| b00 | b11 | STS | IDLE_CMD | | IDLE_PAYLOAD |
| b00 | b11 | STS | b1111 | b0000 | h1e1e1 |
| b00 | b11 | STS | b1111 | b1111 | h1e1e1 |
| b00 | b11 | STS | b1111 | b0000 | h1e1e1 |
| b00 | b11 | STS | b1111 | b1111 | h1e1e1 |

00 - FULL DATA RATE
01 - HALF DATA RATE
10 - HALF DATA RATE
11 - QUARTER DATA RATE

| 39 | 37 | 35 | 31 | 19 | | 0 |
|---|---|---|---|---|---|---|
| b00 | b11 | STS | IDLE_CMD | | | IDLE_PAYLOAD |
| b00 | b11 | STS | b0000 | bxxxx | | h1e1e1 |
| b00 | b11 | STS | b1111 | b0000 | xx | 18bit LINK LAYER DATA |
| b00 | b11 | STS | b0000 | b1111 | | 20bit LINK LAYER DATA |

IDLE WITHOUT DATA
IDLE WITH 18b DATA
IDLE WITH 20b DATA

FIG. 12

| 01 | | 38B DATA, NON-INVERTED |
|----|----|------------------------|
| 10 | | 38B DATA, INVERTED |
| 00 | 11 | 36B SKIP WORD, NON-INVERTED |
| 11 | 00 | 36B SKIP WORD, INVERTED |

LOW LATENCY INTERCONNECT PROTOCOL FOR COHERENT MULTI-CHIP COMMUNICATION

BACKGROUND

Typical network processors schedule and queue work such as packet processing operations for upper level network protocols, and allow processing with respect to upper level network protocols (e.g., transport and application layers) in received packets before forwarding the packets to connected devices. The functions typically performed by network processors include packet filtering, queue management and priority, quality of service enforcement, and access control. By employing features specific to processing packet data, network processors can optimize an interface of a networked device. A network processor can be implemented within a system-on-chip (SOC), which can contain several processing cores sharing a common set of resources within the SOC.

SUMMARY

Example methods and systems of the present invention provide for coherent communications between a number of system-on-chips (SOCs) based on a transmission protocol defined herein as cross-chip interconnect (CCI). In one embodiment, a data message is generated at a first SOC for transmission to a second SOC, where the first and second SOCs each include a cache and a plurality of processing cores.

A stream of data words is generated from the data message, the data words alternating between even data words and odd data words. Each data word in the stream of data words is divided into a first pattern of slices for even data words and a second pattern of slices for odd data words, and the slices distributed across plural output ports at the first SOC.

At each output port, two slices from two successive cycles are grouped and the grouped slices are encoded.

A plurality of metaframes is generated from a stream of encoded grouped slices and the metaframes for each of the output ports are transmitted to the second SOC.

Encoding the grouped slices may include using an encoding scheme to produce an N-bit symbol at M-bits per cycle, alternating between a high part and a low part of the encoding, and generating a plurality of metaframes may be from a stream of N-bit symbols.

In an embodiment, N equals 40 and M equals 20 and the encoding scheme is a 38b/40b encoding scheme.

The data message may be associated with one of a plurality of virtual channels, and a credit count may be maintained for each of the plurality of virtual channels at the first SOC.

The data message may be stored to a retry buffer. The data message may be deleted from the retry buffer upon receiving an acknowledge indicator from the second SOC.

The data message may be retransmitted to the second SOC upon receiving an error indicator from the second SOC.

In another embodiment, a system may include a first system-on-chip (SOC) including a first set of input/output (I/O) ports, a first cache, and a first plurality of processors, the first SOC configured to generate a data message; and a second SOC including a second set of I/O ports, a second cache, and a second plurality of processors, each of the second set of I/O ports connected to a respective port of the first set of I/O ports via a bus.

The first SOC may include an interface configured to 1) generate a stream of data words from the data message, the data words alternating between even data words and odd data words; 2) divide each data word in the stream of data words into a first pattern of slices for even data words and a second pattern of slices for odd data words, and distribute the slices across the first set of I/O ports.

At each of the first set of I/O ports, two slices from two successive cycles may be grouped and encoded. A plurality of metaframes may be generated from a stream of encoded grouped slices and the metaframes transmitted to the second SOC.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 4 illustrates an example link control word.

FIG. 5 illustrates an example initialization link control word.

FIG. 6 illustrates an example retry link control word.

FIG. 11 illustrates formatting of framing control words.

FIG. 12 illustrates formatting of idle words.

FIG. 13 illustrates 38b/40b coding.

DETAILED DESCRIPTION

A description of example embodiments follows.

Figure 1:
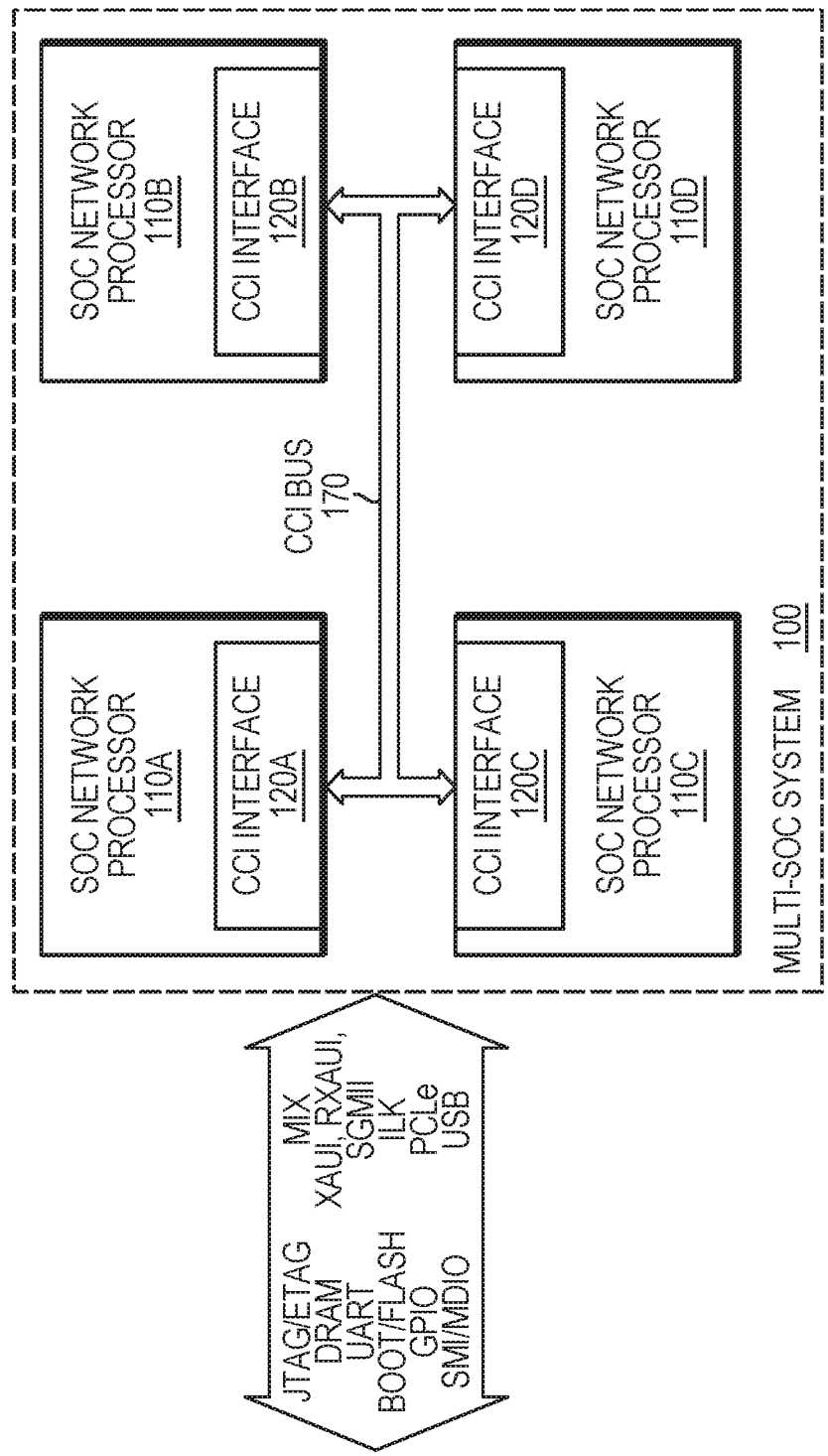
FIG. 1 is a block diagram of a network processing system including a plurality of interconnected SOCs.

FIG. 1 is a block diagram of a network processing system 100 including a plurality of interconnected SOCs 110A-D. The network processing system 100 may be configured to be addressable as a single SOC having multiple network processors, which in turn may be addressable as a single network processor. To provide this capability, the system 100 may include a CCI interface 120A-D to route external communications to the respective ports at each of the network processors 110A-D.

Further, to provide coherence among the network processors 110A-D, the network processors 110A-D may be linked by a common CCI interconnect 170 at each respective CCI interface 120A-D. The CCI interconnect 170 may include a bus, a series of point-to-point connections, or other combination of channels. The CCI interfaces 120A-D communicate with one another to send and receive messages, such as memory requests/responses and work requests/responses, thereby providing coherence across the network processors 110A-D.

The CCI interfaces 120A-D communicate with one another via a protocol described in example embodiments below, referred to as the CCI protocol. In the examples below, the CCI protocol may be a link-layer, point-to-point protocol that provides for the reliable transmission of multi-core interconnect messages between SOCs, also referred as nodes. The multicore interconnect messages may be assigned to logical ("virtual") channels based on a type or class of the message. A substantial number of channels enables greater precision in organizing messages and controlling traffic. Messages sent on the same channel may be ordered, while those sent on different channels may be reordered depending on a priority or other configuration.

The messages (also referred to as "data messages") may be delineated into fixed-size (e.g., 152-byte) words and split or sliced across a configurable number of physical ports ("lanes") for transmission via the CCI interconnect 170.

Figure 2:
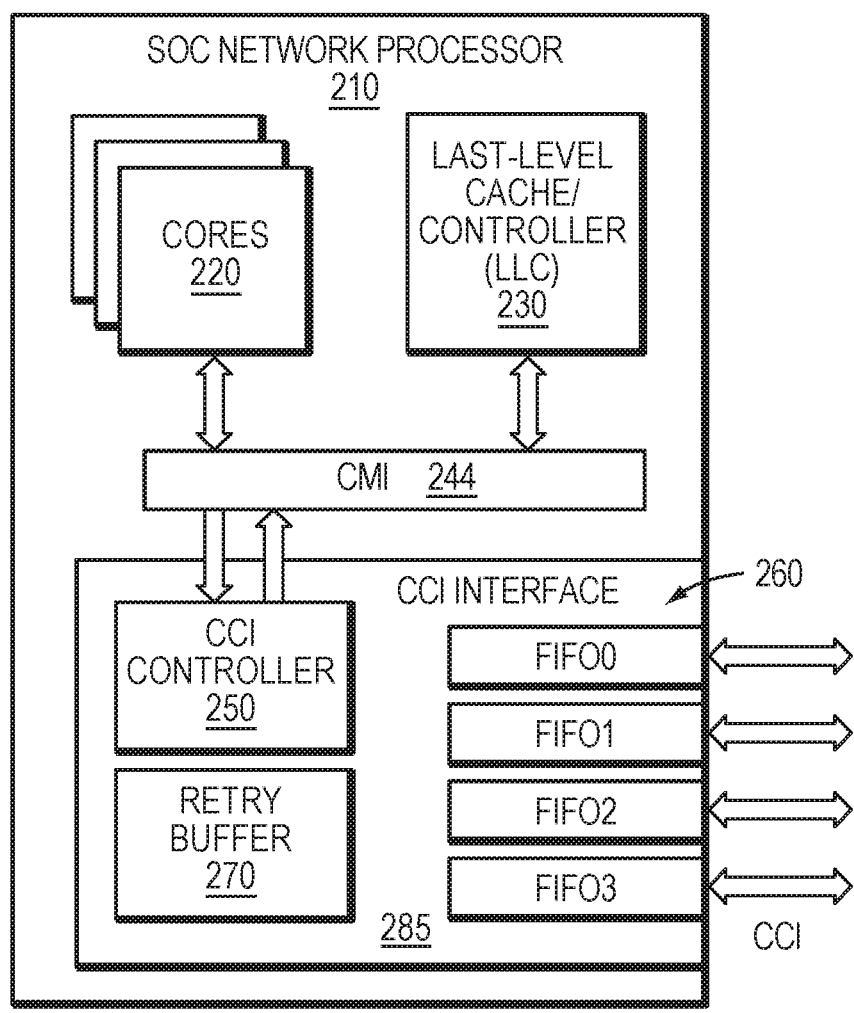
FIG. 2 is a block diagram of a SOC including a cross-chip interface.

FIG. 2 is a block diagram of a SOC 210, including a CCI interface 285 in further detail. The SOC 210 may be configured within a multiple-SOC system such as the system 100 described above with reference to FIG. 1. The CCI interface 285 may connect to a coherent memory interface (CMI) 244 to send and receive messages, such as memory requests/responses and work requests/responses, with plural processing cores 220 and a last-level cache/controller LLC 230. For transmission to external SOCs via the CCI, the CCI interface 285 may include a CCI controller 250, retry buffer 270, and output ports 260 including respective first-in-first-out (FIFO) buffers. The CCI controller 250 may interface with the cores 220 and LLC 230 to exchange messages, and operates to classify outgoing data messages by channels, form data blocks comprising those data messages, and transmit the data blocks via the output ports. Transmitted data blocks may also be stored to the retry buffer 270 until receipt of the data block is acknowledged by the receiver.

In this example embodiment, the CCI interface 285 is configured for transmission of data across the CCI interconnect. In order to receive CCI communications, the SOC may include an additional CCI interface (not shown), which may be configured in a manner similar to the CCI interface 285, with modifications as understood in the art. In particular, a receiving CCI interface may omit a retry buffer, and may include receiver ports in place of output ports. The CCI interface 285 may be configured to have receiver ports in addition to the output ports 260, where the CCI controller 250 may be configured to process received data blocks and forward corresponding data messages to the processing cores 220 and/or the LLC 230.

Link Layer

Figure 3:
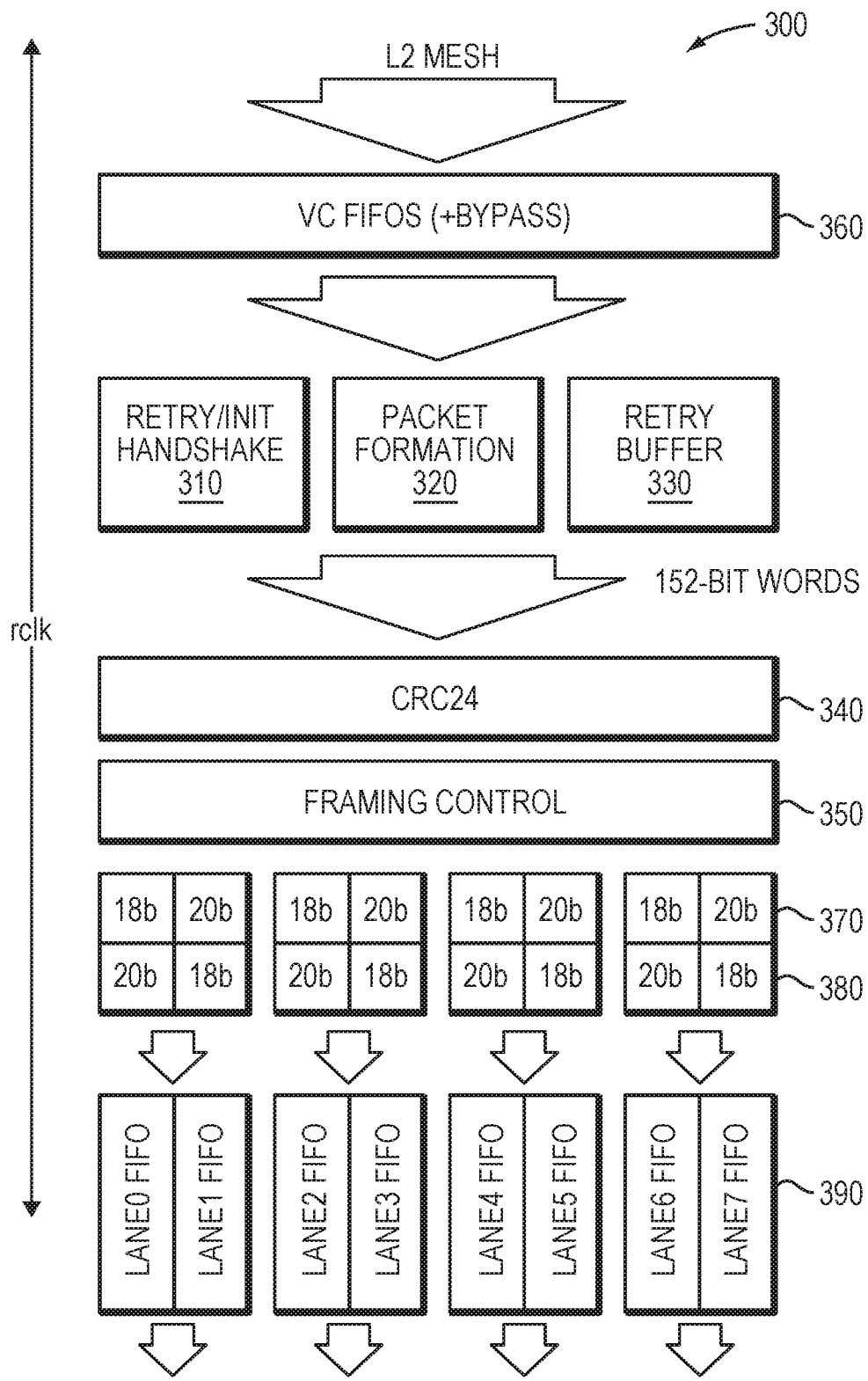
FIG. 3 illustrates an example link layer.

FIG. 3 illustrates a configuration of an example link layer. Data is received at virtual channel FIFOs 360 and formed into 152-bit packets by packet formation function 320 and placed in retry buffer 330. As described further below, a retry/initialization function 310 provides for handshaking. Additional functions provided by the link layer include CRC24 340 and framing control 350. Successive packets are sliced into 8 portions, in 18b/20b patterns that alternate between even and odd data words 370, 380 and transmitted across lanes 390.

The link layer generates a stream of link control words (LCW) and link data words (LDW). All LCWs/LDWs are 152 bits. The LCWs perform some link management tasks such as initialization handshakes and retry handshakes. The initialization handshake occurs when a node comes out of reset and is higher priority than a retry handshake. The retry handshake is performed when a receiver encounters an error. Both handshakes always occur in both directions.

The LDWs carry message data for up to 16 virtual channels. The CCI protocol does not specify the exact number of VCs or requirement for their use. Instead, such details are defined by the coherent memory protocol of a given multi-chip system. An example system may use the following VCs:

VC0—Memory request command, Memory request data
VC1—Memory victim commands, Memory victim data
VC2—I/O request commands, I/O request data
VC3—Memory forwards
VC4—Memory ACKs, I/O ACKs
VC5—Memory responses, I/O Responses The LDWs are transmitted in two forms, namely single-LDW packets and double-LDW packets. The single-LDW packets provide a transfer with lower latency but higher overhead. This is ideal for smaller VC messages, such as memory requests. The double-LDW packets provide for lower overhead for larger VC messages, such as cache block data.

The subsequent sections define the bit layout of LCWs/LDWs. A few bits (bit[151:144]) can be used by the receiver to classify the words as follows:

A LCW is identified by:
Word0[151:144]==0
A single-LDW packet is identified by:
Word0[151]=0
Word0[151:144] !=0
The first word of a double-LDW packet is identified by:
Word0[151]=1
Word0[151:144] !=0
The second word of a double-LDW packet always immediately follows the first.

FIG. 4 is a diagram of an example LCW. A description of each field in the LCW is provided in Table 1.

TABLE 1

Link control words (LCW)

| Bit Position | Field Name | Field Description |
| --- | --- | --- |
| bit[151:144] | Word type | LCW indicated by 8'h0 |
| bit[143:120] | CRC24 | Cyclic redundancy check |
| bit[119:118] | REQ | Handshake request (00 = None, 01 = Retry, 1x = Init) |
| bit[117:116] | ACK | Handshake acknowledge (00 = None, 01 = Retry, 1x = Init) |
| bit[115:112] | KEY | Key select |
| bit[111:96] | RSV | Reserved |
| bit[95:0] | PAYLOAD | Init/retry specific |

The LCWs are not part of multi-word packets, are not written to the retry buffer, do not contain VC data and do not return VC credits.

The REQ/ACK fields are used together to perform the initialization and retry handshakes. The KEY field is used to select the key used to encrypt/decryption all LDWs. The KEY is set to 0 during an initialization handshake, which disables encrypt/decryption. Changing the select KEY simply initiates a retry handshake.

FIG. 5 is a diagram of an example Initialization LCW. A description of each field is provided in Table 2.

TABLE 2

Initialization Link Control Word

| Bit Position | Field Name | Field Description |
| --- | --- | --- |
| bit[151:144] | Word type | LCW indicated by 8'h0 |
| bit[143:120] | CRC24 | Cyclic redundancy check |
| bit[119:118] | REQ | Handshake request (00 = None, 01 = Retry, 1x = Init) |
| bit[117:116] | ACK | Handshake acknowledge (00 = None, 01 = Retry, 1x = Init) |
| bit[115:112] | KEY | Key select, always 0 |
| bit[111:96] | RSV | Reserved |

TABLE 2-continued

Initialization Link Control Word

| Bit Position | Field Name | Field Description |
| --- | --- | --- |
| bit[95:90] | VC15_CC | VC15 credit count/8 |
| bit[89:84] | VC14_CC | VC14 credit count/8 |
| bit[83:78] | VC13_CC | VC13 credit count/8 |
| bit[77:72] | VC12_CC | VC12 credit count/8 |
| bit[71:66] | VC11_CC | VC12 credit count/8 |
| bit[65:60] | VC10_CC | VC10 credit count/8 |
| bit[59:54] | VC9_CC | VC9 credit count/8 |
| bit[53:48] | VC8_CC | VC8 credit count/8 |
| bit[47:42] | VC7_CC | VC7 credit count/8 |
| bit[41:36] | VC6_CC | VC6 credit count/8 |
| bit[35:30] | VC5_CC | VC5 credit count/8 |
| bit[29:24] | VC4_CC | VC4 credit count/8 |
| bit[23:18] | VC3_CC | VC3 credit count/8 |
| bit[17:12] | VC2_CC | VC2 credit count/8 |
| bit[11:6] | VC1_CC | VC1 credit count/8 |
| bit[5:0] | VC0_CC | VC0 credit count/8 |

During the initialization handshake, each transmitter will continuously transmit initialization LCWs.

The received VC*_CC fields are used to initialize the value for the per-VC credit counters. The local device transmits VCx_CC=N, where N*8 is the number of entries in the local device VCx receive FIFO.

VC0_CC=VC0 RX FIFO entries>>3
VC1_CC=VC1 RX FIFO entries>>3
VC2_CC=VC2 RX FIFO entries>>3
. . .
VC15_CC=VC15 RX FIFO entries>>3

While this approach limits the per-VC receive FIFOs to a multiple of 8 entries, they are typically a power of 2 (e.g., 32/64/128/256). Simplifying the VC credit initialization is a reasonable tradeoff.

The KEY field is used to select one of the key slots. An initialization handshake always sets KEY=0, which disables encryption/decryption.

FIG. 6 is a diagram of an example Retry LCW. A description of each field is provided in Table 3.

TABLE 3

Retry Link Control Word

| Bit Position | Field Name | Field Description |
| --- | --- | --- |
| bit[151:144] | Word type | LCW indicated by 8'h0 |
| bit[143:120] | CRC24 | Cyclic redundancy check |
| bit[119:118] | REQ | Handshake request (00 = None, 01 = Retry, 1x = Init) |
| bit[117:116] | ACK | Handshake acknowledge (00 = None, 01 = Retry, 1x = Init) |
| bit[115:112] | KEY | Key select |
| bit[111:96] | RSV | Reserved |
| bit[95] | SQN_ACK | 16X Sequence number acknowledge |
| bit[94:32] | RSV | Reserved |
| bit[31:16] | RX_SQN | Next RX SQN |
| bit[15:0] | TX_SQN | Next TX SQN |

During the retry handshake, each device will continuously transmit retry LCWs. Each device transmits its RX_SQN, which marks the next sequence number that the device expects to receive. Each device transmits its TX_SQN, which marks the next sequence number that the device writes to the retry buffer.

Each device saves the received RX_SQN as RETRY_SQN. Upon exiting the retry handshake, each device begins re-transmitting at RETRY_SQN by reading the LDWs from the corresponding retry buffer positions.

Each device saves the received TX_SQN as KEY_SQN. Upon exiting the retry handshake, the old key is used for decryption until the local device RX_SQN reaches KEY_SQN. KEY_SQN marks the first LDW that should be decrypted using the new key pointed to by the KEY selected during the retry handshake. The reason is that the same LDW data is never to be encrypted with different keys. Therefore, the LDW data is encrypted as it is written to the retry buffer.

The SQN_ACK field must be 0 during a retry handshake. A device may use a single NULL retry-LCW (REQ=0, ACK=0) to acknowledge 16 sequence numbers. This provides a mechanism to ensure a device with a low LDW transmit rate can keep up with the acknowledge rate which equals the LDW receive rate.

An example single LDW is described in Table 4.

TABLE 4

Single Link Data Word

| Bit Position | Field Name | Field Description |
| --- | --- | --- |
| bit[151] | 0 | Indicates one word format |
| bit[150] | ACK_SQN | Sequence acknowledge |
| bit[149:148] | PKT_TYP | Packet type |
| bit[147:145] | RSV | Reserved |
| bit[144] | 1 | |
| bit[143:120] | CRC24 | Cyclic redundancy check |
| bit[119:0] | PKT_D0 | Payload |

The PKT_TYP field allows for 4 different PKT_D0 formats. The exact details of the PKT_* fields are left open to be defined for a specific coherent memory protocol.

The ACK_SQN field acknowledges the reception of 4 sequence numbers.

The CRC24 field contains a cyclic redundancy check covering the entire 152 bit packet. The CRC24 is zeroed for the computation.

An example double LDW is described in Tables 5A and 5B.

TABLE 5A

Double LDW (Word 0)

| Bit Position | Field Name | Field Description |
| --- | --- | --- |
| bit[151] | 1 | Indicates two word format |
| bit[150] | ACK_SQN | Sequence acknowledge |
| bit[149:148] | PKT_TYP | Packet type |
| bit[147:128] | PKT_HDR | Packet header |
| bit[127:0] | PKT_D0 | Payload |

TABLE 5B

Double LDW (Word 1)

| Bit Position | Field Name | Field Description |
| --- | --- | --- |
| bit[151:128] | CRC24 | Cyclic redundancy check |
| bit[127:0] | PKT_D1 | Payload |

The PKT_TYP field allows for 4 different PKT_HDR formats. Each PKT_HDR format may specify the contents of PKT_D0 and PKT_D1, as well as provide a place for additional VC message fields such as source/destination. The exact details of the PKT_* fields are left open to be defined for a specific coherent memory protocol.

The ACK_SQN field acknowledges the reception of 4 sequence numbers.

The CRC24 field contains a cyclic redundancy check covering the entire 152*2 bit packet. The CRC24 is zeroed for the computation.

Every LDW is assigned a sequence number (SQN). The LDW is written to the retry buffer at address (SQN % RETRY_BUFFER_SIZE). The SQN is not transmitted with the LDW, but is implied by both the transmitter and receiver. Each device maintains the following sequence numbers, which are further explained in subsequent sections:

TX_SQN—Next SQN to be written to retry buffer
RX_SQN—Next SQN to be received
ACK_SQN—Next SQN receiver expects to be acknowledged
KEY_SQN—Receive SQN to update the key select
RETRY_SQN—Next SQN to read from retry buffer for re-transmit Note that the LCWs are never assigned a sequence number, are never written to the retry buffer, are never replayed, and never contain any VC data.

TX_SQN is the next sequence number to be assigned to a newly created LDW as it is written to the retry buffer. TX_SQN is initialized to zero during an initialization handshake. TX_SQN is incremented for every LDW. The retry buffer write position for the next LDW is (TX_SQN % RETRY_BUFFER_SIZE).

The local device uses TX_SQN in conjunction with ACK_SQN to avoid overwriting retry buffer entries that may still need to be re-transmitted.

Each device provides its link partner with the TX_SQN during the retry handshake. The purpose is two-fold. First, the link partner can sanity check received TX_SQN. Second, the remote link partner saves the TX_SQN as KEY_SQN when the retry handshake changes the KEY.

RX_SQN is the next sequence number to be received by the local device. RX_SQN is initialized to zero during an initialization handshake. RX_SQN is incremented for every LDW correctly received. Note that this atomically moves by two for double-LDW packets as the failure of the CRC check cannot mark half the packet as correctly received.

Each device provides its link partner with the RX_SQN during the retry handshake. The received RX_SQN is saved as the RETRY_SQN and as the ACK_SQN.

ACK_SQN is the next sequence number for which the local device expects to receive an acknowledgement. (ACK_SQN % RETRY_BUFFER_SIZE) indicates the oldest retry buffer entry that could require re-transmission.

ACK_SQN is initialized to zero during an initialization handshake. ACK_SQN is advanced by 4 for each LDW correctly received with the ACK_SQN field set to 1. ACK_SQN is advanced by 16 for each LCW correctly received with the ACK_SQN field set to 1.

During a retry handshake, ACK_SQN is set to the received RX_SQN. The received RX_SQN indicates the link partner correctly received all previous sequence numbers. Therefore, they are implicitly acknowledged.

KEY_SQN is the first sequence number to be decrypted with the new key which was selected by the KEY field during the previous retry handshake. While a key change is pending, a subsequent key change is prohibited.

RETRY_SQN is the next sequence number to re-transmit. Retransmission begins upon exiting the retry handshake and stops when RETRY_SQN reaches TX_SQN. (RETRY_SQN % RETRY_BUFFER_SIZE) indicates the next retry buffer entry to be read and re-transmission.

The transmitter maintains a per-VC credit counter. These counters are initialized during an initialization handshake to the values received from the link partner. The transmitter avoids overrunning the link partner per-VC FIFOs using the per-VC credit counters. The transmitter decrements the VC credit counter when sending a VC message. The transmitter will not send a VC message unless the corresponding VC credit counter is non-zero. The link partner returns the VC credits when the VC FIFO is unloaded.

LCWs are never used to return VC credits, with the exception that the initialization handshake sets the starting value for each VC credit counter.

Note that LDWs may be replayed without regard to VC credits. The LDWs would only have been placed into the retry buffer upon transmission, and therefore previously secured the necessary VC credits. The fact the retransmission is necessary means the previous message was lost, and has not consumed a VC FIFO entry. In the same way, LDWs that are returning VC credits can be replayed since the previous transmission was lost. Thus, the VC credit exchange provides reliable transport.

The retry buffer stores all transmitted LDWs until they are acknowledged. Each retry buffer entry stores one 152b LDW. A newly generated LDW is assigned the sequence number TX_SQN and is written to the retry buffer entry (TX_SQN % RETRY_BUFFER_SIZE). The TX_SQN is then incremented.

The TX_SQN may not overrun the ACK_SQN. The generation of LDWs must stop if TX_SQN reaches ACK_SQN. For best performance, the retry buffer should be sufficiently large to cover the peak number of LDWs likely to be awaiting acknowledgement. This is a function of the SerDes BAUD rate and the round-trip latency of 4 LDWs to the received ACK_SQN. The framing layer processes one LDW every cycle, where the clock rate is BAUD/20.

RETRY_BUFFER_SIZE>=(LINK_LATENCY/(20/BAUD))

For 25.6 GBAUD, the framing layer processes 1 LDW every 0.781 ns. This means a retry buffer of 256 entries can cover a round-trip latency of 204 ns, and 128 entries can cover 102 ns of round-trip latency.

Note that the retry buffer must never store sequence number acknowledgements. The retry handshakes update the ACK_SQN/RETRY_SQN using the received RX_SQN. This invalidates any ACK_SQN generated prior to the retry handshake.

Regarding retry/init handshakes, such handshakes always happen in both directions. For simplicity, a single direction retry handshake will first be described.

Figure 7:
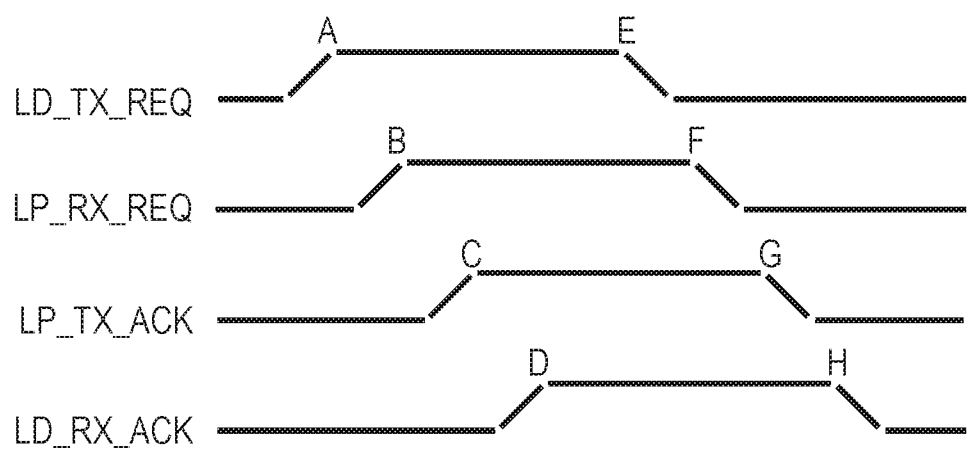
FIG. 7 illustrates an event timeline for retry handshaking.

The local device initiates a retry handshake by sending a continuous stream of LCWs with REQ=1. This continues through the following events A-H and as shown in FIG. 7, where each event causes the next. Upon event H, the local device returns to transmitting LDWs.

A. The local device begins transmitting LCWs with REQ=1
B. The link partner begins receiving LCWs with REQ=1
C. The link partner begins transmitting LCWs with ACK=1
D. The local device beings receiving LCWs with ACK=1
E. The local device begins transmitting LCWs with REQ=0
F. The link partner begins receiving LCWs with REQ=0
G. The link partner begins transmitting LCWs with ACK=0
H. The local device beings receiving LCWs with ACK=0

In order to perform the handshake in both directions, a device merely needs to transmit REQ=1 upon receiving REQ=1.

The 2-bit REQ/ACK fields of the next LCW to be transmitted can therefore be computed as:

TX_REQ_NEXT=(TX_REQ|RX_REQ|{RESET,ERROR}) & ~RX_ACK

TX_ACK_NEXT=RX_REQ

Figure 8:
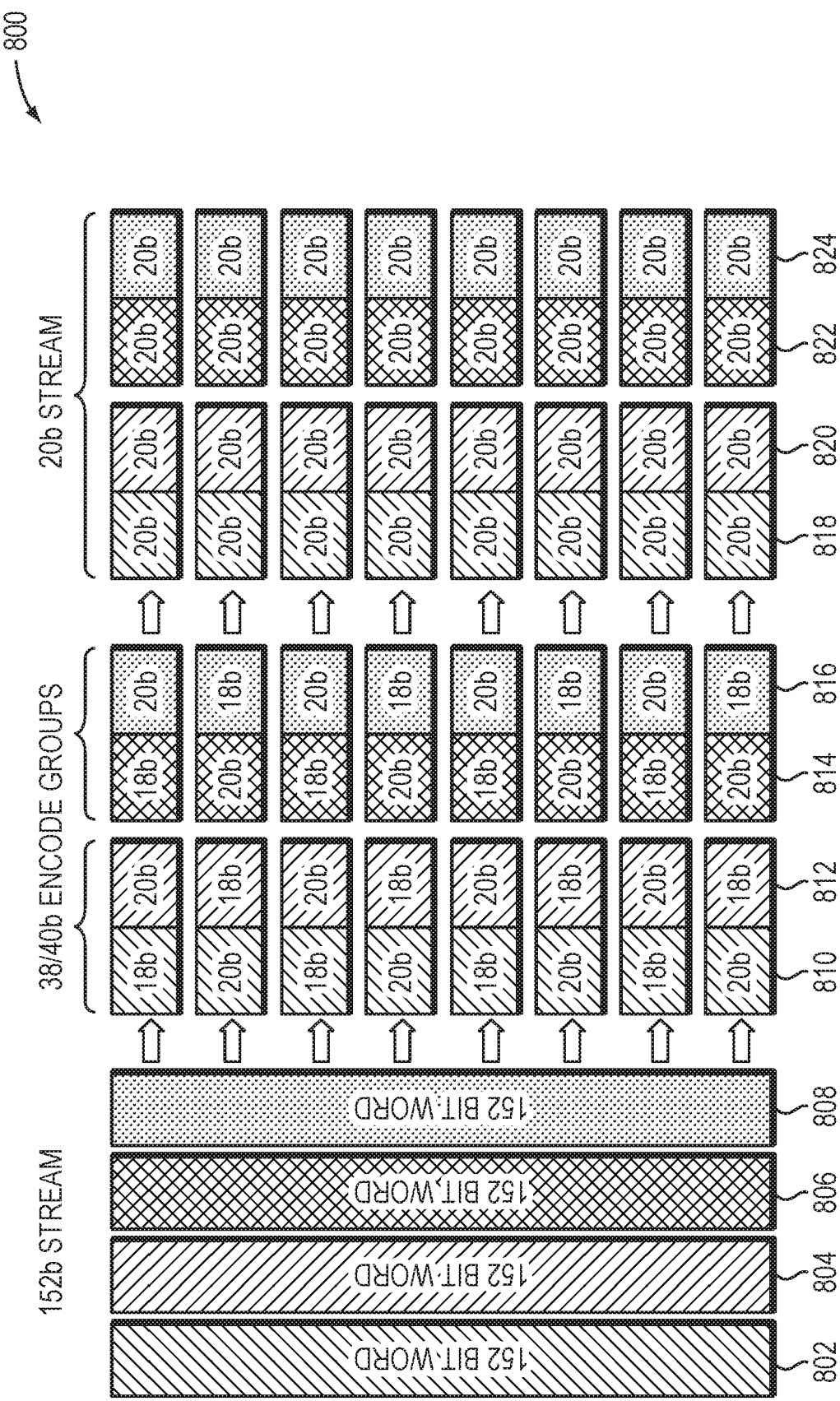
FIG. 8 is a diagram showing an example LCW/LDW slicer.

FIG. 8 is a diagram of an example LCW/LDW slicer 800. The stream 802, 804, 806, 808 of LCWs/LDWs produced by the link layer are sliced into 8 parts 810, 812, 814, 816 and delivered to the lanes for framing layer processing. Each link may contain 2/4/8 lanes. The data is sliced in a pattern such that each lane gets a stream of slices that are ready for 38b/40b encoding. Encoding results in 20b per cycle 818, 820, 822, 824. Table 6A shows the pattern for slicing the first four 152b words over 8 lanes:

TABLE 6A

| Slicing Pattern Over 8 Lanes | |
|---|---|
| Lane 0 | Lane 1 |
| {2'b1, W0[17:0]} | {W0[37:18]} |
| {W1[19:0]} | {2'b1, W1[37:20]} |
| {2'b1, W2[17:0]} | {W2[37:18]} |
| {W3[19:0]} | {2'b1, W3[37:20]} |
| Lane 2 | Lane 3 |
| {2'b1, W0[55:38]} | {W0[75:56]} |
| {W1[57:38]} | {2'b1, W1[75:58]} |
| {2'b1, W2[55:38]} | {W2[75:56]} |
| {W3[57:38]} | {2'b1, W3[75:58]} |
| Lane 4 | Lane 5 |
| {2'b1, W0[93:76]} | {W0[113:94]} |
| {W1[95:76]} | {2'b1, W1[113:96]} |
| {2'b1, W2[93:76]} | {W2[113:94]} |
| {W3[95:76]} | {2'b1, W3[113:96]} |
| Lane 6 | Lane 7 |
| {2'b1, W0[131:114]} | {W0[151:132]} |
| {W1[133:114]} | {2'b1, W1[151:134]} |
| {2'b1, W2[131:114]} | {W2[151:132]} |
| {W3[133:114]} | {2'b1, W3[151:134]} |

Table 6B shows the pattern for slicing the first four 152b words over 4 lanes:

TABLE 6B

| Slicing Pattern Over 4 Lanes | |
|---|---|
| Lane 0 | Lane 1 |
| {2'b1, W0[17:0]} | {W0[37:18]} |
| {W0[95:76]} | {2'b1, W0[113:96]} |
| {2'b1, W1[17:0]} | {W1[37:18]} |
| {W1[95:76]} | {2'b1, W1[113:96]} |
| {2'b1, W2[17:0]} | {W2[37:18]} |
| {W2[95:76]} | {2'b1, W2[113:96]} |
| {2'b1, W3[17:0]} | {W3[37:18]} |
| {W3[95:76]} | {2'b1, W3[113:96]} |
| Lane 2 | Lane 3 |
| {2'b1, W0[55:38]} | {W0[75:56]} |
| {W0[133:114]} | {2'b1, W0[151:134]} |
| {2'b1, W1[55:38]} | {W1[75:56]} |
| {W1[133:114]} | {2'b1, W1[151:134]} |
| {2'b1, W2[55:38]} | {W2[75:56]} |
| {W2[133:114]} | {2'b1, W2[151:134]} |
| {2'b1, W3[55:38]} | {W3[75:56]} |
| {W3[133:114]} | {2'b1, W3[151:134]} |

Table 6C shows the pattern for slicing the first four 152b words over 2 lanes:

TABLE 6C

| Slicing Pattern Over 2 Lanes | |
|---|---|
| Lane 0 | Lane 1 |
| {2'b1, W0[17:0]} | {W0[37:18]} |
| {W0[57:38]} | {2'b1, W0[75:58]} |
| {2'b, W0[93:76]} | {W0[113:94]} |
| {W0[133:114]} | {2'b, W0[151:134]} |
| {2'b1, W1[17:0]} | {W1[37:18]} |
| {W1[57:38]} | {2'b1, W1[75:58]} |
| {2'b1, W1[93:76]} | {W1[113:94]} |
| {W1[133:114]} | {2'b, W1[151:134]} |
| {2'b1, W2[17:0]} | {W2[37:18]} |
| {W2[57:38]} | {2'b1, W2[75:58]} |
| {2'b1, W2[93:76]} | {W2[113:94]} |
| {W2[133:114]} | {2'b, W2[151:134]} |
| {2'b1, W3[17:0]} | {W3[37:18]} |
| {W3[57:38]} | {2'b1, W3[75:58]} |
| {2'b1, W3[93:76]} | {W3[113:94]} |
| {W3[133:114]} | {2'b, W3[151:134]} |

Framing Layer

Figure 9:
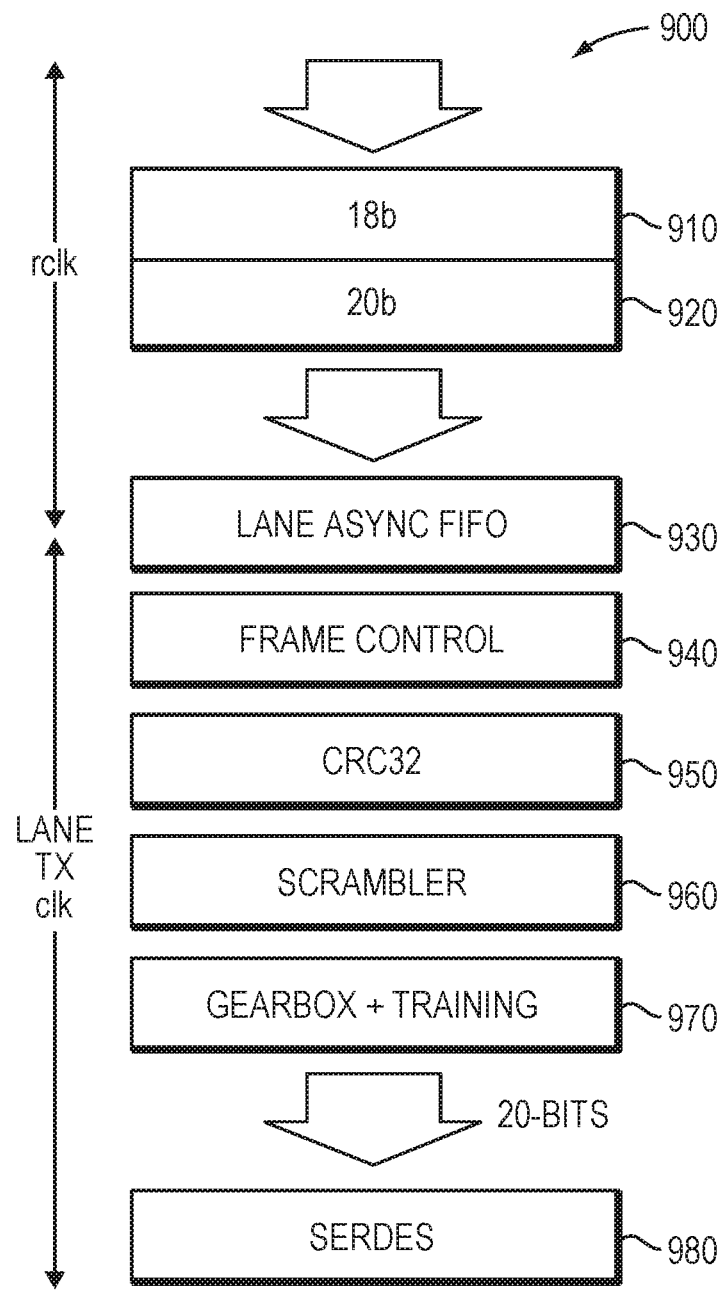
FIG. 9 illustrates an example framing layer.

FIG. 9 illustrates an example framing layer configuration 900 for handling an encoded stream 910, 920. At each lane async FIFO 930, the framing layer provides functions that include frame control 940, CRC32 950, scrambler 960, and gearbox/training 970 prior to transmission by the SerDes 980.

The framing layer generates a stream of 38b/40b encoded words at a rate of BAUD/(n*20), where n is typically 1 and BAUD is the SerDes BAUD rate. The clock rate of the framing layer is therefore BAUD/(n*20). For n=1, the framing layer produces a 20-bit portion (referred to herein as a flit) every cycle. The 20-bit flit alternates between the high/low part of the 38b/40b word.

Figure 10:
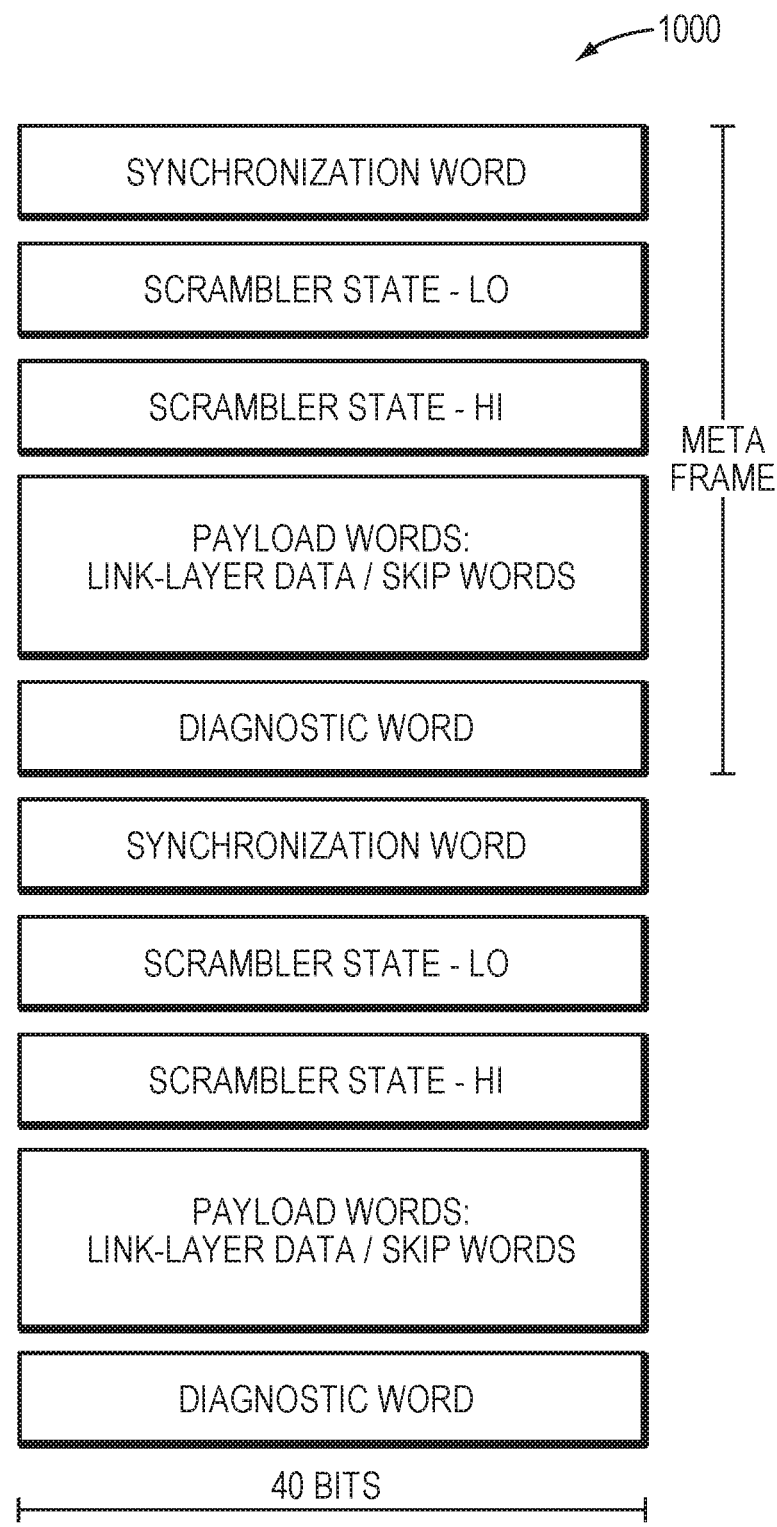
FIG. 10 is a diagram showing an example metaframe.

The stream of 38b/40b words are grouped into metaframes. The number of 38b/40b words in the group is configurable, although 2K is typical. A metaframe consists of framing control words and payload words. FIG. 10 is a diagram that illustrates a metaframe configuration 1000 using the framing control words and payload words.

The four types of framing control words, shown in FIG. 11, include:
 i. Synchronization words (SYNC)
 ii. Scrambler-state-high words (SCRH)
 iii. Scrambler-state-low words (SCRL)
 iv. Diagnostic words (DIAG)

The two types of payload words include:
 i. Data words (DATA)
 ii. Idle words (IDLE)

Each DATA word contains an 18-bit slice of a link control/data word (LCW/LDW) and a 20-bit slice of a LCW/LDW. The LCWs/LDWs are typically produced in another clock domain, sliced into a number of 18-bit and 20-bit parts, and then each lane gets 1/2/4 slices of each LCW/LDW via an asyncronous FIFO. When the link has eight lanes, each lane gets one slice of each LCW/LDW. When the link has four lanes, each lane gets two slices of each LCW/LDW. When the link has two lanes, each lane gets four slices of each LCW/LDW.

Each IDLE word contains one of the following, as shown in FIG. 12:
 i. No LCW/LDW slices
 ii. A single 18-bit slice of a LCW/LDW
 iii. A single 20-bit slice of a LCW/LDW
 iv. Data rate change command.

The data rate change command allows for indicating a full data rate, half data rate and a quarter data rate. This allows a receive asynchronous FIFO to have a pop clock that is slower than the framing layer clocks (BAUD/(n*20)) since idle words are not pushed into the receive asynchronous FIFO.

The metaframe always begins with a SYNC word, followed by SCRH and SCRL. After the first three words, there are (METAFRAME LEN-4) payload words, where each is either a DATA word or an IDLE word. The final word of a metaframe is always a DIAG word.

The synchronization word (SYNC) marks the start of a metaframe and provides lane status information. All lanes that are part of a link generate a synchronization word at the same time. The 8-bit lanes status is differential manchester encoded (DME) resulting in 16 bits. The 8-bit lanes status is defined as follows:

LANE_STATUS[4:0]—Physical lane id (i.e., 0 . . . 23)
LANE_STATUS[5]—Reserved
LANE_STATUS[6]—LD_SYNC_VAL
LANE_STATUS[7]—LD_LANE_XON Transmitting the physical lane id allows the receiver at the remote link partner to automatically detect lane reversal and link swap. This allows for flexible multi-chip connectivity without requiring software to configure the CCI.

LD_SYNC_VAL=1 indicates that the lanes receiver has obtained scrambler synchronization valid. LD_LANE_XON=1 indicates the lane is bound to the link and is therefore carrying slices of LCWs and LDWs. The local device will only transmit LD_LANE_XON=1 if the receiver has obtained scrambler synchronization and has received SYNC words that indicate the link partner has also obtained scrambler synchronization. In other words, transmitting LD_LANE_XON=1 requires both receiving/transmitting synchronization words with LD_SYNC_VAL=1.

The payload words are scrambled to statistically prevent the transmission of a long string of 1s or 0s, allowing for clock recovery at the receiver. The scrambler uses the following polynomial:

$x^{58}+x^{39}+1$

The scrambler state is initialized at reset to the following 58-bits:

0x2aaaaaaaaaaa∥tie_lane_id∥~tie_lane_id∥tie_lane_id

The scrambler state is inserted into the scrambler-state-high words (SCRH) and scrambler-state-low words (SCRL). These scrambler-state words always appear after the synchronization (SYNC) word at the start of each metaframe. This allows the receiver to independently synchronize its scrambler-state and correctly descramble the data stream.

In order to avoid introducing latency, an implementation running at a clock rate of BAUD/20 should process the 38b/40b words over two cycles. During the first cycle, the 18-bits of input data are XOR'd with the upper 18-bits of the scrambler-state and the scrambler is advanced by 18-bits. During the second cycle, the 20-bits of input data are XOR'd with the upper 20-bits of the scrambler-state and the scrambler is advanced by 20-bits.

The SYNC, SCRH, and SCRL words are not scrambled and do not cause the scrambler to advance.

The IDLE words are scrambled in the same manner as LCWs/LDWs, except that bit[38:37] will remain 0b11. This exception ensures IDLE words can be identified by the 4-bit framing pattern: 0b0011. Note that the scrambler state is advanced and XOR'd with the input 38b/40b word in the same manner, except the final output bits[38:37] are forced to 0b11.

The 38b/40b encoding is DC balanced to +/−57-bits (max disparity is 38+(38/2)), as shown in FIG. 13. The transmitter maintains a disparity counter. The counter is incremented for each bit of the TX data which is set to '1'. The counter is decremented for each bit of the TX data which is set to '1'.

The transmitter computes the disparity of each 38b/40b encoded word. If the disparity of the word has the same sign as the existing disparity counter, the entire 38b/40b word must be inverted.

Each scrambler-state word (SCRH/SCRL) contains the high/low part of the DC field. DC[5:0] is a data word slice counter. Each transmit lane maintains a 6-bit data word slice counter. The counter is cleared when transmitting LD_LANE_XON=0 (i.e. XOFF). The counter is incremented for each LCW/LDW slice transmitted. The counter is inserted into SCRH/SCRL words. The link partner maintains an identical 6-bit data word slice counter and checks the counter received in SCRH/SCRL words. A mismatch is treated the same as a scrambler state mismatch. The counter is used by the receiver at the remote link partner to align the LCW/LDW slices. This allows a transmitter to generate/slice LCWs/LDWs different clock domain. The slices are then synchronized directly to the per-lane transmit clocks. The per-lane transmit clocks are not perfectly aligned. As a result, all the lanes will not necessarily see the slices of the same LCW/LDW word at the same position within the metaframe. The data word slice counter is therefore an alignment marker.

The transmitter computes CRC over the entire metaframe using the following polynomial. The resulting CRC32 is inserted into the diagnostic (DIAG) word.

$x^{32}+x^{28}+x^{27}+x^{26}+x^{25}+x^{23}+x^{22}+x^{20}+x^{19}+x^{18}+x^{14}+x^{13}+x^{11}+x^{10}+x^{9}+x^{8}+x^{6}+1$

In order to avoid introducing latency, an implementation running at a clock rate of BAUD/20 may process the 38b/40b words over two cycles.

At first, it may appear necessary to add an extra cycle of latency to simultaneously include the full 38 bits in the CRC32 computation. This is because processing only the upper 18-bit requires inserting the upper 12 bits of the finished CRC32 the cycle before 20-bit second half arrives. However, since the lower 20-bits of the diagnostic are zero, it is possible to remove this cycle by adding the IV-XOR component of the CRC32 calculation for the lower 20-bits of the diagnostic word during the cycle that transmitter is processing the upper 18-bits of the diagnostic word.

The teachings of all patents, published applications and references cited herein are incorporated by reference in their entirety.

It should be further understood that the examples presented herein can include more or fewer components, be partitioned into subunits, or be implemented in different combinations. Moreover, the diagrams herein may be implemented in hardware, firmware, or software. If implemented in software, the software may be written in any suitable software language. The software may be embodied on any form of computer readable medium, such as Random Access Memory (RAM), Read-Only Memory (ROM), or magnetic or optical disk, and loaded and executed by generic or custom processor(s).

While example embodiments have been particularly shown and described, it will be understood by those skilled in the art that various changes in form and details may be made therein without departing from the scope of the embodiments encompassed by the appended claims.

What is claimed is:

1. A method comprising:
    generating a data message at a first system-on-chip (SOC) for transmission to a second SOC, the first and second SOCs each including a cache and a plurality of processing cores;
    generating a stream of data words from the data message, the data words alternating between even data words and odd data words;
    dividing each data word in the stream of data words into a first pattern of slices for even data words and a second pattern of slices for odd data words, and distributing the slices across plural output ports at the first SOC;
    at each output port,
        grouping two slices from two successive cycles and encoding the grouped slices; and
        generating a plurality of metaframes from a stream of encoded grouped slices; and
    transmitting the plurality of metaframes for each of the output ports to the second SOC.

2. The method of claim 1, wherein the data message is associated with one of a plurality of virtual channels.

3. The method of claim 2, further comprising maintaining a credit count for each of the plurality of virtual channels at the first SOC.

4. The method of claim 3, wherein the data message is a first data message, and further comprising, in response to receiving a second data message at the first SOC, incrementing the credit count of a respective one of the plurality of virtual channels.

5. The method of claim 3, further comprising detecting the credit count at the first SOC for the virtual channel associated with the data message, wherein transmitting the data message is dependent upon the detecting.

6. The method of claim 3, further comprising generating the data message to include an indicator for incrementing at least one of the credit counts.

7. The method of claim 3, further including decrementing the credit count for the virtual channel associated with the data message upon the transmission of the data message from the first SOC to the second SOC.

8. The method of claim 1, further comprising storing the data message to a retry buffer.

9. The method of claim 8, further comprising deleting the data message from the retry buffer upon receiving an acknowledge indicator from the second SOC.

10. The method of claim 8, further comprising, upon receiving an error indicator from the second SOC, retransmitting the data message to the second SOC.

11. The method of claim 1, wherein generating the stream of data words includes generating link control words configured for link management.

12. The method of claim 1, wherein encoding the grouped slices includes using an encoding method to produce an N-bit symbol at M-bits per cycle, alternating between a high part and a low part of the encoding, and wherein generating the plurality of metaframes is from a stream of N-bit symbols.

13. The method of claim 12, wherein N equals 40 and M equals 20 and the encoding method is a 38b/40b encoding method.

14. A system comprising:
    a first system-on-chip (SOC) including a first set of input/output (I/O) ports, a first cache, and a first plurality of processors, the first SOC configured to generate a data message;
    a second SOC including a second set of I/O ports, a second cache, and a second plurality of processors, each of the second set of I/O ports connected to a respective port of the first set of I/O ports via a bus;
    the first SOC including an interface configured to 1) generate a stream of data words from the data message, the data words alternating between even data words and odd data words; 2) divide each data word in the stream of data words into a first pattern of slices for even data words and a second pattern of slices for odd data words, and distribute the slices across the first set of I/O ports; 3) at each of the first set of I/O ports,
        i) group two slices from two successive cycles and encode the grouped slices; and
        ii) generate a plurality of metaframes from encoded grouped slices; and
    4) transmit the plurality of metaframes for each of the first set of I/O ports to the second SOC.

15. The system of claim 14, wherein the interface is further configured to define a plurality of virtual channels associated with the first and second I/O ports, and wherein the data message is associated with at least one of the plurality of virtual channels.

16. The system of claim 15, wherein the interface is further configured to maintain a credit count for each of the plurality of virtual channels at each of the first and second sets of I/O ports.

17. The system of claim 16, wherein the interface is further configured to detect the credit count at the first set of I/O ports for the virtual channel associated with the data message, the interface causing the data message to be transmitted to the second cache based on the detection.

18. The system of claim 16, wherein the interface is further configured to generate the data message to include an indicator for incrementing at least one of the credit counts.

19. The system of claim 16, wherein the interface is further configured to decrement the credit count for the virtual channel associated with the data message upon the transmission of the data message.

20. The system of claim 14, further comprising a retry buffer, wherein the interface is further configured to store the data message to the retry buffer.

21. The system of claim 20, wherein the interface is further configured to delete the data message from the retry buffer upon receiving an acknowledge indicator from the second set of I/O ports.

22. The system of claim 20, wherein the interface is further configured, upon receiving an error indicator from the second set of I/O ports, to retransmit the data message to the second set of I/O ports.

23. The system of claim 14, wherein the interface is further configured to generate link control words configured for link management.

24. The system of claim 14, wherein encoding the grouped slices includes using an encoding method to produce an N-bit symbol at M-bits per cycle, alternating between a high part and a low part of the encoding, and wherein generating the plurality of metaframes is from a stream of N-bit symbols.

25. The system of claim 24, wherein N equals 40 and M equals 20 and the encoding method is a 38b/40b encoding method.

* * * * *